United States Patent [19]

Shiga et al.

[11] Patent Number: 4,461,881
[45] Date of Patent: Jul. 24, 1984

[54] PROCESS FOR THE PRODUCTION OF PURIFIED PROPYLENE HOMOPOLYMERS OR COPOLYMERS

[75] Inventors: Akinobu Shiga; Kiyoshi Matsuyama; Masahiro Kakugo; Yukio Naito; Takatoshi Suzuki, all of Ehime, Japan

[73] Assignee: Sumitomo Chemical Co., Ltd., Osaka, Japan

[21] Appl. No.: 314,344

[22] Filed: Oct. 23, 1981

Related U.S. Application Data

[63] Continuation of Ser. No. 184,861, Sep. 8, 1980, abandoned.

[30] Foreign Application Priority Data

Sep. 6, 1979 [JP] Japan .................................. 54-114774

[51] Int. Cl.³ ............................. C08F 6/08; C08F 4/64
[52] U.S. Cl. .................................... 526/118; 526/137; 526/142; 528/494; 528/502; 528/503
[58] Field of Search ...................... 528/494, 502, 503; 526/118, 137, 142

[56] References Cited

U.S. PATENT DOCUMENTS

| | | | |
|---|---|---|---|
| 2,974,132 | 3/1961 | Jacobi | 528/494 |
| 4,053,697 | 10/1977 | Asada | 526/142 |
| 4,117,219 | 9/1978 | Kakogawa | 528/494 |
| 4,182,852 | 1/1980 | Shiga | 528/494 |
| 4,195,145 | 3/1980 | Shiga | 526/137 |

FOREIGN PATENT DOCUMENTS

| | | | |
|---|---|---|---|
| 50-29946 | 9/1975 | Japan | 528/494 |
| 51-1274 | 1/1976 | Japan | 528/494 |

Primary Examiner—C. A. Henderson
Attorney, Agent, or Firm—Sughrue, Mion, Zinn, Macpeak and Seas

[57] ABSTRACT

In a process for producing a homopolymer or a copolymer of propylene comprising polymerizing propylene or copolymerizing propylene and at least one other unsaturated hydrocarbon monomer in liquid propylene using a catalyst system containing activated titanium trichloride (a) and an organoaluminum compound (b), the activated titanium trichloride (a) being prepared by reducing titanium tetrachloride with an organoaluminum compound followed by activation, to produce a polymer slurry; introducing the polymer slurry produced into the top of a counter-current washing tower; and washing the polymer slurry by counter-currently contacting the polymer slurry with liquid propylene introduced into the bottom of the washing tower, the improvement which comprises purifying the homopolymer or copolymer of propylene by feeding an epoxide in a molar amount of about 1 to about 15 times the molar amount of the total of activated titanium trichloride (a) and organoaluminum compound (b), to a part of said washing tower, thereby deactivating the catalyst and removing the catalyst residue and the homopolymer or copolymer of propylene dissolved in the polymer slurry.

2 Claims, 1 Drawing Figure

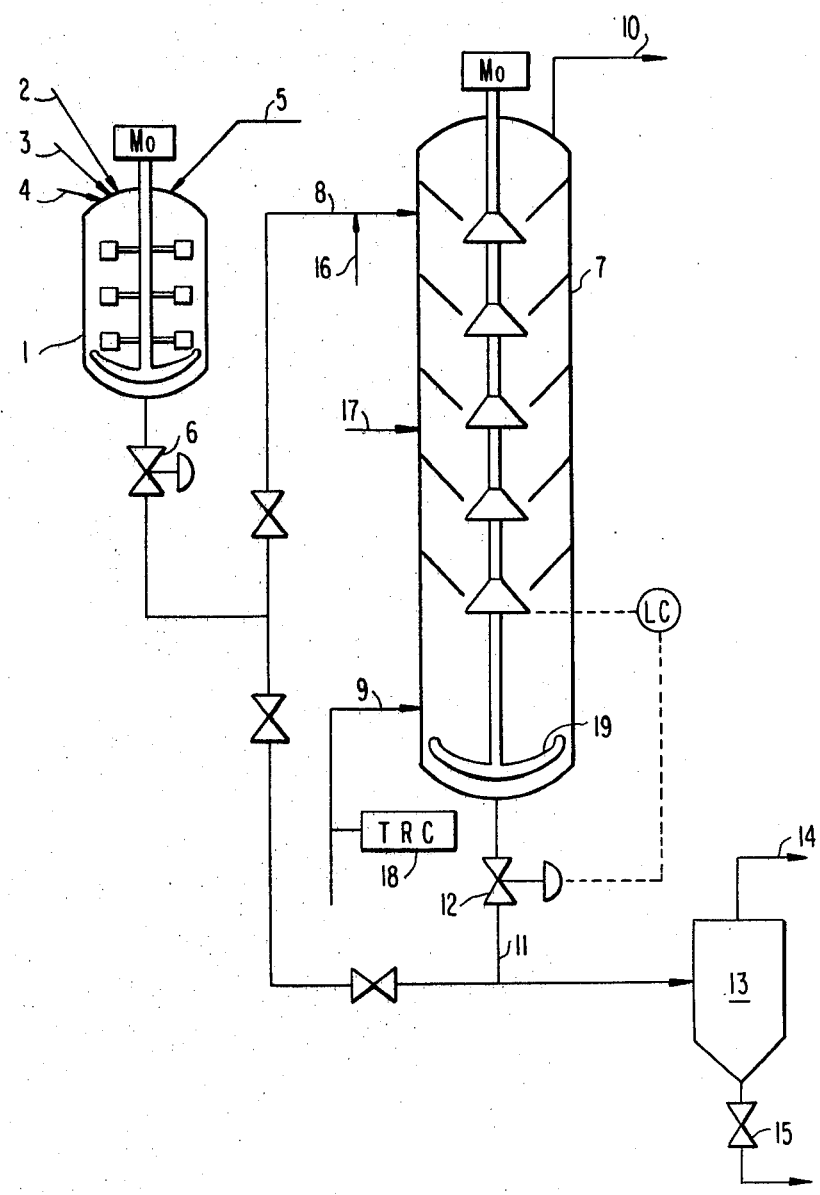

PROCESS FOR THE PRODUCTION OF PURIFIED PROPYLENE HOMOPOLYMERS OR COPOLYMERS

This is a continuation of application Ser. No. 184,861, filed Sept. 8, 1980 now abandoned.

BACKGROUND OF THE INVENTION

1. Field of the Invention

This invention relates to a process for the production of purified propylene homopolymers or copolymers in industrially advantageous manner.

2. Description of the Prior Art

Homopolymerization or copolymerization of propylene in liquid propylene (hereinafter referred to as "bulk polymerization") is known and widely applied in industry.

In comparison with the polymer slurry produced using conventional suspension (or solvent) polymerization (referred to as "conventional solvent polymerization" hereinafter) in which the polymerization is generally carried out in a liquid saturated hydrocarbon solvent having 5 or more, preferably 5 to 7, carbon atoms, the polymer slurry produced using bulk polymerization is quite advantageous in that separation of the polymer produced from the solvent can be carried out very easily by merely subjecting the slurry to reduced pressure because the unsaturated hydrocarbon monomers (mainly propylene) used as a polymerization solvent have such a high vapor pressure that they are easily vaporized.

In general, however, polymers obtained by this bulk polymerization process have some disadvantages because they contain large amounts of both polymers soluble in boiling n-heptane as a by-product and catalyst residues. Accordingly, such polymers have inferior physical properties, as described hereinafter.

As to polymers soluble in boiling n-heptane, when bulk polymerization is carried out, for example, with a combined catalyst of titanium trichloride and triethyl aluminum, the produced polymer contains only 75 to 85% by weight of boiling n-heptane-insoluble polymer. Also, when a combined catalyst of titanium trichloride and diethyl aluminum chloride is used, the content of boiling n-heptane-insoluble polymer is 85 to 95% by weight.

Such polymers containing large amounts of boiling n-heptane-soluble polymers have inferior physical properties, particularly with respect to stiffness and tackiness. Therefore, these polymers can be used for molding but they are not suitable for films and fibers requiring relatively good physical properties.

As to the catalyst residues, on the other hand, a reduction in the amount of the catalyst residue in bulk polymerization is inherently possible, since the polymerization has a high polymerization rate and can be operated at a high level of catalyst efficiency as compared with conventional solvent polymerization. However, a very large amount of organoaluminum compounds must be used in order to maintain high levels of catalyst efficiency and selectivity. For example, when bulk polymerization of propylene is carried out in liquid propylene using highly active titanium trichloride and diethyl aluminum chloride, as is disclosed in Japanese Patent Application (OPI) No. 34478/72 (the term "OPI" as used herein refers to a "published unexamined Japanese patent application"), high levels of activity and selectivity cannot be maintained unless 0.2 g or more of diethyl aluminum chloride per kg of liquid propylene is used. When large amounts of the organoaluminum compound remain in the polymer as a catalyst residue, the produced polymers have markedly reduced stability, and are easily degraded by heat, thus resulting in foaming and coloration. Consequently, such polymers cannot be used when high quality is desired.

In order to obtain high quality propylene polymers, therefore, the boiling n-heptane-soluble polymers and catalyst components remaining as residue must be removed.

Extensive investigations were made to improve the quality of such polymers since for a polymer slurry produced using bulk polymerization, polymers soluble in the slurry, residual catalyst dissolved in the slurry and a part of residual catalyst deposited from the slurry can easily be separated from the slurry in a counter-current washing tower using liquid propylene as a washing solvent. This led to an industrially advantageous process for producing homopolymers and copolymers of propylene (i.e., as described in Japanese Patent Application (OPI) Nos. 79589/75, 139886/76 and 3679/77 and U.S. Pat. No. 4,053,697).

According to this process, the catalyst residue resulting from the organoaluminum compound can greatly be removed. However, the catalyst residue resulting from the titanium trichloride solid catalyst is not substantially removed and remains and, furthermore, polymers having high molecular weights are easily formed in the washing tower. Therefore, the polymers obtained by the above process, when molded at high temperatures, provide those films having low levels of hue which are inferior in thermal stability. Moreover, when they are neutralized by adding fatty acid metal salts, etc. (because when left as are, they corrode metals) a freed fatty acid adheres onto metal rolls during the production of films and makes the metal rolls dirty. In addition, the high molecular weight polymers formed in the washing tower markedly deteriorate the transparency of films. Thus, they cannot be used as are in the manufacture of products for which high quality is required.

An improved method, therefore, has been proposed in which alcohols containing 3 to 8 carbon atoms or mixtures of such an alcohol and an epoxide, the molar amounts of the alcohol and epoxide to the organoaluminum compound being, respectively, 0.1 to 10 and 0.1 to 3, are introduced into the washing tower (see U.S. Pat. No. 4,182,852). According to this method, the formation of high molecular weight polymers in the washing tower can be prevented, but a large amount of the catalyst residue resulting from the titanium trichloride solid catalyst still remains without removal.

According to the examples of U.S. Pat. No. 4,182,852, although the pellet color of the polymers is good, $TiO_2$ remains in an amount of 14 to 39 ppm, and when molded at high temperatures, films having low levels of hue are obtained. Therefore, as proposed in Japanese Patent Application (OPI) No. 68889/79, it has been required to add an additional step in which the polymer slurry is further brought in contact with gaseous epoxides.

A principal object of this invention, therefore, is to provide an improved method for industrially advantageously producing propylene homopolymers or copolymers which are much more purified as compared with those obtained by the above-described prior art methods, without providing any additional step.

As a method of purifying polyolefins obtained by bulk polymerization, Japanese Patent Publication No. 29946/75 proposes a treatment with an epoxide in an amount of 15 mols or more per mol of the catalyst component and subsequent washing with a lower hydrocarbon. Additionally, Japanese Patent Publication No. 1274/76 proposes a treatment with an alcohol containing 3 or more carbon atoms and an alkylene oxide and subsequent washing with a lower hydrocarbon.

These methods, however, need complicated treating and washing steps, and they cannot be said to be a simplified method. Furthermore, they need a relatively large amount of a treating agent, and they are thus not advantageous from the industrial standpoint.

SUMMARY OF THE INVENTION

It has now been found according to this invention that the catalyst residue can efficiently be removed without any additional step.

This invention, therefore, provides a process for the production of purified propylene homopolymers or copolymers comprising polymerizing propylene or copolymerizing propylene and at least one other unsaturated hydrocarbon monomer in liquid propylene using a catalyst system comprising (a) titanium trichloride obtained by the reduction of titanium tetrachloride with an organoaluminum compound followed by activation and (b) an organoaluminum compound, introducing the polymer slurry produced into the top of a counter-current washing tower, and washing the polymer slurry by counter-currently contacting the polymer slurry with liquid propylene introduced into the bottom of the washing tower, wherein an epoxide is introduced into the washing tower in an amount of about 1 to about 15 mols per mol of the total of the activated titanium trichloride and organoaluminum compound.

BRIEF DESCRIPTION OF THE DRAWING

The FIGURE is a simple flow sheet of an embodiment of this invention.

DETAILED DESCRIPTION OF THE INVENTION

The process according to this invention gives rise to the following effects simultaneously:

(1) The process can be simplified; the treating and washing steps which the conventional technique requires are not required.

(2) The amount of the treating agent which is used can be reduced as compared with the prior art methods.

(3) Propylene homopolymers or copolymers containing a markedly reduced amount of catalyst residue can be obtained.

Catalyst component (a) as used in this invention is an activated titanium trichloride obtained by the reduction of titanium tetrachloride with an organoaluminum compound followed by activation. An activated titanium trichloride obtained by reducing titanium tetrachloride with an organoaluminum compound and activating the resulting reduced solid with a complexing agent and a halogen compound simultaneously or successively is preferably used in this invention.

The organoaluminum compound used for the reduction of titanium tetrachloride is represented by the formula:

$$AlR_lX_{3-l}$$

wherein R represents a straight chain, branched chain or cyclic alkyl group or an aryl group having up to 18 carbon atoms and X represents a halogen atom or a hydrogen atom and l is a number $1 \leq l \leq 3$. Examples of these organoaluminum compounds include methyl aluminum dichloride, ethyl aluminum dichloride, n-propyl aluminum dichloride, ethyl aluminum sesquichloride, dimethyl aluminum chloride, diethyl aluminum chloride, di-n-propyl aluminum chloride, trimethyl aluminum, triethyl aluminum, triisobutyl aluminum, ethyl dicyclohexyl aluminum, triphenyl aluminum, diethyl aluminum hydride, diisobutyl aluminum hydride, diethyl aluminum bromide and diethyl aluminum iodide.

Of the above compounds, diethyl aluminum chloride and ethyl aluminum sesquichloride provide especially preferred results.

The reduction reaction is carried out at about $-60°$ C. to about 60° C., preferably $-30°$ C. to 30° C. There is no particular restriction on the reaction time, but the reaction time usually ranges from about 1 to about 10 hours. In order to complete the reduction of titanium tetrachloride to titanium trichloride, an after-reaction at an elevated temperature not exceeding about 150° C. is preferably performed. Preferably the reduction reaction is carried out in an inert hydrocarbon solvent such as pentane, hexane, heptane, octane or decane. The reduced solid may optionally be heat-treated in the presence or absence of an inert hydrocarbon solvent. A suitable heat-treatment temperature is about 100° to about 180° C. There is no particular restriction on the heat-treatment time, but usually periods of 30 minutes to 5 hours are convenient.

A preferred complexing agent is an ether compound of the formula:

$$R^1-O-R^2$$

wherein $R^1$ and $R^2$ are each a straight chain, branched chain or cyclic alkyl group having 1 to 10 carbon atoms. Representative ethers include diethyl ether, di-n-propyl ether, diisopropyl ether, di-n-butyl ether, diisoamyl ether, dineopentyl ether, di-n-hexyl ether, methyl n-butyl ether, methyl isoamyl ether, ethyl isobutyl ether, etc. Of these ether compounds, di-n-butyl ether and diisoamyl ether give especially preferred results.

The reaction of the reduced solid with the ether compound is advantageously carried out in the presence of a diluent. Suitable diluents which can be used are inert hydrocarbons such as hexane, heptane, octane, decane, decalin, benzene, toluene and xylene.

In the present invention, the ether compound may be added to titanium tetrachloride prior to the reduction, to the reaction mixture during the reduction reaction, to the reduced solid or a halogen compound-treated solid as it is or diluted with an inert hydrocarbon solvent.

The amount of the ether compound used is about 0.05 to about 3.0 mols, preferably 0.5 to 1.5 mols, per mol of titanium trichloride contained in the reduced solid. The reaction temperature is desirably about 0° to about 150° C. There is no particular limitation on the treatment time, but periods of about 20 minutes to about 5 hours are used conveniently.

Preferred halogen compounds are:

(i) halogen or interhalogen compounds of the formula:

$$X^1X^2_a$$

wherein $X^1$ and $X^2$ are each a chlorine, bromine or iodine atom and a is a number from 1 to 3;
   (ii) titanium halides; and
   (iii) organic halogen compounds.

As specific examples of the halogen or interhalogen compounds, chlorine, bromine, iodine, bromine chloride, iodine chloride, iodine trichloride, iodine bromide, etc., are illustrative. Of these compounds, iodine is particularly preferred.

As titanium halides, there are titanium tetrachloride, titanium tetrabromide, titanium tetraiodide and mixtures thereof. Of these compounds, titanium tetrachloride is particularly preferred.

As organic halogen compounds, those having 1 to 18 carbon atoms and 1 to 38 halogen atoms are preferred. Specifically, there are halogen-substituted alkanes such as carbon tetrachloride, chloroform, hexachloroethane, ethyl iodide, butyl iodide and the like.

Of these halogen compounds, halogen or interhalogen compounds designated as (i) above are especially preferred.

Desirably, the reaction with the halogen compound is carried out in an inert hydrocarbon solvent such as hexane, heptane, octane, decane, benzene, toluene or xylene.

The treatment may be carried out using various procedures, for example, (i) the ether-treated solid may be reacted with the halogen compound, (ii) the reduced solid may be reacted with the halogen compound and then reacted with the ether, (iii) the reduced solid may be reacted with a mixture of the ether compound and the halogen compound, and (iv) the halogen compound may be added to the reduced reaction mixture obtained by reducing titanium tetrachloride with the organoaluminum compound in the presence of the ether compound. The catalytic activity of activated titanium trichloride varies depending on the type of the halogen compound used and reaction procedures. When a halogen, an interhalogen compound or an organic halogen compound as the halogen compound is used, procedures (i) to (iv) may be adopted, but when the titanium halide is used, procedures (i) to (iii) should be adopted. Accordingly, the required activated titanium trichloride can be easily prepared by selecting the appropriate halogen compound and procedure.

The amount of the halogen or halogen compound used is usually about 0.001 to about 2.0 mols, preferably 0.005 to 1.0 mol, more preferably 0.03 to 0.5 mol, per mol of titanium trichloride contained in the reduced solid or ether-treated solid, but not limited thereto. The reaction temperature can be optionally chosen, but is preferably from about $-30°$ C. to about $200°$ C., more preferably from $0°$ C. to $150°$ C., most preferably $0°$ C. to $100°$ C.

The reaction time is also not particularly restricted, but usually periods of from about 5 minutes to about 5 hours are conveniently used.

As specific examples of preferred activated titanium trichloride, there may be given activated titanium trichloride disclosed in (1) U.S. Pat. No. 4,123,387 and (2) U.S. Pat. No. 4,165,298. An activated titanium trichloride in (1) is produced by reducing titanium tetrachloride with an organoaluminum compound, followed by reaction with a mixture of carbon tetrachloride and an ether. An activated titanium trichloride in (2) is produced by reducing titanium tetrachloride with an organoaluminum compound, followed by reaction with a mixture of an ether and a halogen or interhalogen compound or monohalogenated hydrocarbon.

Also, the activated titanium trichlorides disclosed in (3) British Pat. No. 1,391,068, (4) Japanese Patent Publication No. 24194/78 and (5) U.S. patent application Ser. No. 920,888 (filed June 30, 1978) can be used preferably.

The activated titanium trichloride in (3) is produced by reducing titanium tetrachloride with an organoaluminum compound, followed by treatment with a complexing agent and titanium tetrachloride in this order. The activated titanium trichloride in (4) is produced by reducing titanium tetrachloride with an organoaluminum compound in the presence of an ether and an iodine or an iodine compound, followed by contact with a releasing agent (Lewis acid). The activated titanium trichloride in (5) is produced by reducing titanium tetrachloride with an organoaluminum compound in the presence of an ether, followed by reaction with iodine.

Well-known titanium trichlorides, other than the essential activated titanium trichloride in the present invention, for example, commercially available titanium trichlorides produced by the reduction of titanium tetrachloride with metallic aluminum followed by activation by pulverizing (e.g., titanium trichloride AA produced by Stauffer Co., Ltd.), have a low catalytic activity and give polymers of low stereoregularity, in addition, have a broad particle size distribution. Consequently, when they are used in the present invention, a large part of the polymer flows out of the washing tower together with the washing liquor, which results in a large loss of polymer, In addition, since many difficulties with respect to pipes and other equipment occur, smooth operation of the plant becomes impossible.

Component (b) as used in this invention in combination with the above-described activated titanium trichloride (a) is preferably an organoaluminum compound represented by the formula:

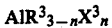

wherein $R^3$ is an alkyl group containing 1 to 18 carbon atoms, $X^3$ is a halogen selected from the group of Cl, Br and I, and n is a number satisfying the relation $3 > n \geq 0$.

Among these organoaluminum compounds, a dialkyl aluminum monohalide (i.e., n=1) is particularly preferred. As such a dialkyl aluminum monohalide, diethyl aluminum chloride is ordinarily used.

The catalyst system used in the present invention comprises the activated titanium compound described above and an organoaluminum compound. The catalyst system of the present invention may, however, also contain well-known third components such as amines, ethers, esters, sulfur, halogens, benzene, azulene derivatives, organic or inorganic nitrogen compounds, phosphorus compounds and the like.

In the production of the propylene copolymers of this invention, any unsaturated hydrocarbon monomers copolymerizable with propylene in the presence of the catalyst system of this invention can be used. In general, α-olefins such as ethylene, butene-1, 4-methylpentene-1, hexene-1, etc., are used. These monomers may be used in admixtures comprising two or more thereof. The feed ratio of the comonomer can be varied within the range that the copolymer obtained is in a solid particle form.

Suitable examples of epoxides which can be used in this invention include alkylene oxides and glycidyl ethers, such as ethylene oxide, propylene oxide, butylene oxide, epichlorohydrin, methyl glycidyl ether, ethyl glycidyl ether, butyl glycidyl ether, etc. Of these epoxides, low boiling point epoxides, e.g., ethylene oxide and propylene oxide, are particularly preferred.

By using alcohol in place of the epoxide of this invention, the effects of this invention cannot be obtained. The use of a large amount of alcohol considerably reduces the amount of the catalyst residue remaining in the polymer, but not to the extent that is attained by the method of this invention. Moreover, it is a very uneconomical method.

In the process of this invention, however, the epoxide may be used in combination with the alcohol. By using the epoxide in combination with the alcohol, the ash content can be reduced to the same extent as attained by use of the epoxide alone. When the alcohol is used in combination with a small amount of the epoxide, there are obtained effects somewhat preferred in the improvement of corrosiveness.

Suitable examples of alcohols which can be used are those containing 3 to 8 carbon atoms, such as n-propanol, isopropanol, n-butanol, isobutanol, sec-butanol, n-hexanol, 2-ethylhexanol, etc. The amount of the alcohol used is not critical, but about 0.1 to about 20 mols per mol of the total of the activated titanium trichloride (a) and organoaluminum compound (b), can be used with the range of 1 to 10 mols being more preferred. The alcohol and epoxide may be introduced, separately or in admixture with each other, into the washing tower. Alternatively, prior to the washing and the treatment with the epoxide, the polymer slurry may be brought in contact with the alcohol.

The process of this invention can be simplified as compared with the prior art methods, and also the necessary amount of the epoxide can be unexpectedly reduced as compared with those in the prior art methods.

While the amount of the epoxide used should be changed depending upon the type and amount of the catalyst used, it is preferably supplied in an amount of about 0.01 to about 1.0 mol/liter based upon increasing propylene flow. The epoxide is added in a molar amount of about 1 to about 15 times, preferably 3 to 10 times, most preferably 4 to 8 times, the molar amount of the total of the activated titanium trichloride (a) and organoaluminum compound (b).

The washing and the treatment with the epoxide are carried out within the temperature range that propylene is kept in a liquid form and the polymer obtained is in a solid particle form. In general, they are carried out at temperatures of about 20° to about 100° C., preferably 40° to 80° C.

The washing period is ordinarily about 3 minutes to about 5 hours, preferably 10 minutes to 2 hours.

Hereinafter, the method of this invention will be explained by reference to the accompanying drawing.

The FIGURE is a flow sheet illustrating an embodiment of this invention.

Liquid propylene, an unsaturated hydrocarbon monomer (e.g., ethylene), a molecular weight regulating agent (e.g., hydrogen) and catalyst components (a) and (b) are fed to a polymerization reactor 1 through lines 2, 3, 4 and 5, respectively.

The polymerization is carried out at about 30° to about 100° C. and under a pressure at which the propylene is maintained liquid. The produced polymer slurry is fed, which can be fed batchwise but preferably is fed continuously, from the reactor 1 to the top 8 of a counter-current washing tower 7 through a valve 6 (referred to as "top feed" hereinafter). Liquid propylene which does not contain any soluble polymers (mainly amorphous polymers), preferably fresh propylene, is fed to the bottom of the tower 7 through a line 9 (referred to as "bottom feed" hereinafter).

An epoxide or a mixture of an epoxide and an alcohol is fed, as it is or diluted with liquid propylene, to the tower through a line 9, 16 or 17. The epoxide or a mixture of the epoxide and alcohol is most preferably fed through a line 17 to bring the epoxide or mixture into intimate contact with the polymer thereby enhancing the washing effect achieved. Polymers which are soluble in the slurry and reaction products between the residual catalyst and the epoxide are selectively discharged through an overflow line 10 and introduced into a process for recovering amorphous polymers. The polymer slurry is counter-currently contacted with the liquid propylene of the bottom feed of the tower 7. The slurry-insoluble polymer is deposited at the bottom and, when the pressure is released to about atmospheric pressure by the action of a valve 12 interlocked with a level (or concentration) controller LC, the polymer is discharged through a line 11 and introduced into a flash tank 13.

The monomers containing mainly liquid propylene which are gaseous at atmospheric pressure are vaporized in the flash tank 13 and sent to a purifying process through a line 14.

The polymer separated in the flash tank 13 is sent, as it is or, if necessary, through aftertreatments such as catalyst decomposition, to a hopper or granulator through a valve 15.

The structure of the counter-current washing tower, preferably is that as disclosed in Japanese Patent Application (OPI) Nos. 79589/75 and 3679/77 the abovedescribed requirements are met.

The present invention will be illustrated in more detail by reference to the following examples and comparative examples, which are not however to be interpreted as limiting the present invention. Unless otherwise indicated, all parts, percents, ratios and the like are by weight.

EXAMPLE 1

(1) Preparation of Catalyst Component (a)

(1) Preparation I (Preparation of Reduced Solid)

After the atmosphere in a 200-liter reactor was replaced with argon, 40 liters of dry hexane and 10 liters of titanium tetrachloride were placed therein and the resulting solution was kept at −5° C. A solution consisting of 30 liters of dry hexane and 23.2 liters of ethyl aluminum sesquichloride was added dropwise to the solution while maintaining the temperature of the reaction system at −3° C. or less. Stirring of the reaction system was continued for 2 hours at the same temperature. After the reaction was completed, the reaction system was allowed to stand, and the reduced solid thus-obtained was separated from the liquid portion at 0° C. and washed twice with 40 liters of hexane. Thus, 16 kg of a reduced solid was obtained.

(2) Preparation II

The reduced solid obtained in Preparation I above was slurried in n-decalin to form a slurry and the slurry concentration was adjusted to 0.2 g/cc. The resulting slurry was heat-treated at 140° C. for 2 hours. After the reaction was completed, the supernatant liquid was discharged and the product was washed twice with 40 liters of hexane to obtain Titanium Trichloride Composition (A).

(3) Preparation III 11 kg of Titanium Trichloride Composition (A) prepared in Preparation II above was slurried in 55 liters of toluene, and iodine and diisoamyl ether were added thereto so that the molar ratio of Titanium Trichloride Composition (A) to $I_2$ to diisoamyl ether was 1:0.1:1.0. The reaction was carried out at 80° C. for 1 hour to obtain an activated Titanium Trichloride (B).

(2) Polymerization of Propylene and Purifying of Produced Polymer

Liquid propylene (1,500 kg/hr), activated Titanium Trichloride (B) (40 g/hr) and diethyl aluminum chloride (600 g/hr) were continuously fed to a 30—$m^3$ polymerization reactor at 70° C. in the presence of hydrogen. Thus, propylene was polymerized using the flow method. During that time, the pressure in the reactor was 31 to 31.8 kg/cm$^2$G, and the produced polymer slurry was discharged from the bottom of the reactor so that the level in the reactor was kept constant.

Under these conditions, the discharged polymer slurry comprised 600 kg/hr of a solid polymer of propylene, 12 kg/hr of a so-called atactic polymer soluble in liquid propylene and 895 kg/hr of unreacted liquid propylene containing most of the aluminum compound charged.

This polymer slurry was continuously discharged from the bottom of the reactor and fed to the top 8 of the counter-current multistage washing tower 7 as illustrated in the FIGURE.

Into the washing tower was introduced 580 g (10 mols) of propylene oxide under pressure at the middle part 17 between the top and the bottom of the washing tower.

Purified liquid propylene maintained at 61° to 64° C. was continuously fed at a flow rate of 1,100 kg/hr to the washing tower from the bottom 9 thereof, and the stirring in the washing tower was carried out at a markedly slow rate of 12 rpm. During the operation, the pressure in the washing tower was 26.1 to 27.0 kg/cm$^2$G. The polymer deposited at the bottom of the washing tower was continuously discharged through a reducing valve 12 interlocked with a level controller LC and a line 11 into the flash tank 13.

At the top 10 of the washing tower was discharged 1,500 kg/hr of liquid propylene containing the aluminum compound and 12 kg/hr of the atactic polymer, which was then introduced into a recovery process for the atactic polymer. Loss of the fine powdery solid polymer contained therein was 1% or less. Thus, the polymer slurry discharged from the bottom of the washing tower was introduced in the flash tank 13 where it was separated, and the purified powdery polymer was obtained from the bottom of the flash tank.

The counter-current washing tower as used in this example had a diameter of 600 mm and a height of 8,200 mm and included 10 conical rotary plates.

The proportion (II%) of the residue extracted by boiling n-heptane was 98.4%. Characteristics of the thus-obtained polymer, such as the corrosiveness on soft steel, the residual ash content in the polymer as measured by the fluorescent X-ray method, etc., and characteristics of a 30μ thick film which was produced by extruding the polymer with a phenol based antioxidant added from a 40 mm φ T-die extruder at a die temperature of 280° C. are shown in Table 1.

All the $TiO_2$, $Al_2O_3$ and Cl contents were markedly low, and the hue of the film was good. Moreover, the corrosiveness was markedly low as compared with the practically allowable upper limit of 1.2 and improved to such an extent that it was not necessary to neutralize by adding fatty acid metal salts.

The amounts of Ti, Al and Cl contained in the polymer slurry prior to the introduction into the washing tower, which were calculated from the amount of each catalyst component charged and the amount of the produced polymer, were 34 ppm for $TiO_2$, 415 ppm for $Al_2O_3$ and 334 ppm for Cl.

COMPARATIVE EXAMPLE 1

The procedure of Example 1 was repeated with the exception that propylene oxide was charged at a rate of 150 g/hr. The results are shown in Table 1.

As compared with the polymer obtained in Example 1, the $TiO_2$, $Al_2O_3$ and Cl contents were large, and the hue of film and corrosiveness were poor.

EXAMPLES 2 & 3

The procedure of Example 1 was repeated with the exception that the epoxides shown in Table 1 were used in place of propylene oxide. The results are shown in Table 1.

The ash content was markedly low as in Example 1, and the hue of film was good.

COMPARATIVE EXAMPLE 2

The procedure of Example 1 was repeated with the exception that 740 g (10 mols)/hr of isobutanol was charged in place of propylene oxide. The results are shown in Table 1.

As can be seen from Table 1, the $TiO_2$ and Cl contents were large and the hue of film was bad as compared with the polymer obtained in Example 1. The corrosiveness was not substantially improved.

COMPARATIVE EXAMPLE 3

The procedure of Comparative Example 2 was repeated with the exception that isobutanol was charged in a large amount of as much as 7,400 g/hr. The results are shown in Table 1.

The $TiO_2$ and Cl residual contents were greatly reduced as compared with those in Comparative Example 2, but not to the extent attained in Example 1. Furthermore, as compared with Example 1, the corrosiveness was very bad.

COMPARATIVE EXAMPLE 4

The procedure of Example 1 was repeated with the exception that a mixture of propylene oxide and isopropanol was used in place of propylene oxide (this follows the procedure of Example 3 of U.S. Pat. No. 4,182,852). The results are shown in Table 1.

EXAMPLE 4

Using an activated titanium trichloride preparation by the method as described below in place of the activated titanium trichloride as used in Example 1, propylene and ethylene were copolymerized in a 30—$m^3$ polymerization reactor.

(1) Preparation of Catalyst Component (a)

(1) Preparation I (Preparation of Reduced Solid)

After the atmosphere in a 200-liter reactor was replaced with argon, 40 liters of dry hexane and 10 liters of titanium tetrachloride were placed therein and the resulting solution was kept at −5° C. A solution consisting of 30 liters of dry hexane and 11.6 liters of diethyl aluminum chloride was dropwise added to the solution while maintaining the temperature of the reaction system at −3° C. or less. After completion of the addition, the stirring was further continued for 30 minutes, and the temperature was then elevated to 70° C. at which temperature the stirring was further continued for 1 hour.

The reaction system was allowed to stand to thereby separate a reduced solid, and the thus-separated reduced solid was washed three times with 40 liters of hexane to obtain 15 kg of a reduced solid. The thus-obtained reduced solid contained 4.60% by weight of aluminum (Al).

(2) Preparation II (Preparation of Ether-Treated Solid)

The reduced solid as obtained in Preparation I above was suspended in 40 liters of dry hexane, and diisoamyl ether was then added thereto in a ratio of 1.2 mols per mol of the titanium trichloride contained in the reduced solid. The resulting system was stirred at 40° C. for 1 hour.

After the reaction was completed, the supernatant liquid was discharged, and the ether-treated solid was washed three times with 40 liters of hexane and then dried.

After the reaction was completed, the supernatant liquid was discharged, and the reaction product was washed three times with 30 liters of hexane and then dried to obtain an activated titanium trichloride.

(2) Copolymerization of Ethylene and Propylene

By use of the activated titanium trichloride as obtained in Preparation III above, propylene and ethylene were copolymerized in a 30−m$^3$ polymerization reactor.

The copolymerization and washing were carried out in the same manner as in Example 1 except for the following points:

| Catalyst | |
|---|---|
| Feed rate of activated titanium trichloride (a) | 50 g/hr |
| Feed rate of organoaluminum compound (b) | 600 g/hr |
| Feed rate of methyl methacrylate | 30 g/hr |
| Polymerization | |
| Temperature | 60° C. |
| Pressure | 26 kg/cm$^2$G |
| Feed rate of liquid propylene | 1,500 kg/hr |
| Feed rate of ethylene | 60 kg/hr |
| Washing | |
| Propylene for washing | 52 to 55° C. |
| Propylene oxide | 1,450 g/hr |
| Isopropanol | 1,850 g/hr |

The ethylene content of the copolymer thus-obtained was 3% by weight. The results are shown in Table 1. Like the polymer as obtained in Example 1, this copolymer exhibited good characteristics.

TABLE 1

| | Example No. | | | | Comparative Example No. | | | |
|---|---|---|---|---|---|---|---|---|
| | 1 | 2 | 3 | 4 | 1 | 2 | 3 | 4 |
| Epoxide | Propylene Oxide | Ethylene Oxide | Propylene Oxide | Propylene Oxide | Propylene Oxide | — | — | Propylene Oxide |
| Feed Rate (g/hr) | 580 | 880 | 2,030 | 1,450 | 150 | — | — | 150 |
| Molar Ratio to Components (a) + (b) | 1.9 | 3.8 | 6.7 | 4.7 | 0.49 | — | — | 0.5 |
| Supply Position | Line 17 | Line 9 | Line 17 | Line 17 | Line 17 | — | — | Line 17 |
| Alcohol | — | — | — | Isopropanol | — | Isobutanol | Isobutanol | Isopropanol |
| Feed Rate (g/hr) | — | — | — | 1,850 | — | 740 | 7,400 | 300 |
| Molar Ratio to Components (a) + (b) | — | — | — | 5.8 | — | 1.9 | 19 | 0.95 |
| Supply Position | — | — | — | Line 16 | — | Line 17 | Line 17 | Line 17 |
| TiO$_2$ (ppm) | 8 | 5 | 5 | 5 | 35 | 25 | 14 | 17 |
| Al$_2$O$_3$ (ppm) | 10 | 14 | 9 | 12 | 22 | 13 | 18 | 11 |
| Cl (ppm) | 19 | 22 | 18 | 17 | 39 | 35 | 34 | 30 |
| Corrosiveness | 0.6 | 0.4 | 0.2 | 0.2 | 6.0 | 4.6 | 4.2 | 1.5 |
| Haze (%) | 2.3 | 2.3 | 2.2 | 2.1 | 2.8 | 2.2 | 2.0 | 2.2 |
| Blocking (g/100cm$^2$) | 15 | 13 | 14 | 16 | 20 | 16 | 14 | 14 |
| Young's Modulus (kg/cm$^2$) | 6,800 | 6,900 | 6,900 | 6,960 | 6,600 | 6,800 | 6,600 | 6,650 |
| Hue | Good | Good | Good | Good | Yellowish | Yellowish | Slighyly yellowish | Good |

(3) Preparation III 10 kg of the ether-treated solid prepared in Preparation II above was added to a solution consisting of 30 liters of dry heptane and 20 liters of titanium tetrachloride, and the mixture was treated at 70° C. for 2 hours.

While the invention has been described in detail and with reference to specific embodiments thereof, it will be apparent to one skilled in the art that various changes and modifications can be made therein without departing from the spirit and scope thereof.

What is claimed is:

1. In a process for producing a homopolymer or a copolymer of propylene comprising polymerizing propylene or copolymerizing propylene and at least one other unsaturated hydrocarbon monomer in liquid propylene using a catalyst system containing activated titanium trichloride (a) and an organoaluminum compound (b), the activated titanium trichloride (a) being prepared by reducing titanium tetrachloride with an organoaluminum compound represented by the formula:

$$AlR_lX_{3-l}$$

wherein R represents a straight chain, branched chain or cyclic alkyl group or an aryl group having up to 18 carbon atoms and X represents a halogen atom or a hydrogen atom and l is a number $1 \leq l \leq 3$, and reacting the reduced solid simultaneously or successively with an ether represented by the formula:

$$R^1\text{—}O\text{—}R^2$$

wherein $R^1$ and $R^2$ are each a straight chain, branched chain or cyclic alkyl group having 1 to 10 carbon atoms, and a halogen compound selected from the group consisting of
   (i) halogen or interhalogen compounds of the formula:

$$X^1X^2_a$$

wherein $X^1$ and $X^2$ are each a chlorine, bromine or iodine atom and a is a number from 1 to 3;
   (ii) titanium halides; and
   (iii) organic halogen compounds,
to produce a slurry; introducing the polymer slurry produced into the top of a countercurrent washing tower; and washing the polymer slurry by countercurrently contacting the polymer slurry with liqud propylene introduced into the bottom of the washing tower,
   the improvement for purifying the homopolymer or copolymer of propylene which consists essentially of feeding an epoxide selected from the group consisting of ethylene oxide and propylene oxide in a molar amount of about 3 to about 10 times the molar amount of the total of activated titanium trichloride (a) and organoaluminum compound (b), to a part of said washing tower, thereby deactivating the catalyst and removing the catalyst residue and the homopolymer or copolymer of propylene dissolved in the polymer slurry.

2. The process according to claim 1, wherein the amount of the epoxide is 4 to 8 mols per mol of the total of activated titanium trichloride (a) and organoaluminum compound (b).

* * * * *